(12) United States Patent
Leconte et al.

(10) Patent No.: US 9,987,581 B2
(45) Date of Patent: Jun. 5, 2018

(54) VEHICLE FILTER SYSTEM

(71) Applicant: AGCO INTERNATIONAL GmbH, Hesston, KS (US)

(72) Inventors: Valentin Daniel Joel Leconte, Cempuis (FR); Etienne Demeiller, Lanchéres (FR)

(73) Assignee: AGCO International GmbH, Neuhausen (CH)

( * ) Notice: Subject to any disclaimer, the term of this patent is extended or adjusted under 35 U.S.C. 154(b) by 38 days.

(21) Appl. No.: 15/180,857

(22) Filed: Jun. 13, 2016

(65) Prior Publication Data

US 2016/0367928 A1 Dec. 22, 2016

(30) Foreign Application Priority Data

Jun. 22, 2015 (EP) .................................. 15290163

(51) Int. Cl.
| | |
|---|---|
| *B60H 3/06* | (2006.01) |
| *B60H 1/00* | (2006.01) |
| *B60H 1/26* | (2006.01) |
| *B01D 46/00* | (2006.01) |
| *B01D 46/44* | (2006.01) |

(52) U.S. Cl.
CPC ....... *B01D 46/0067* (2013.01); *B01D 46/444* (2013.01); *B01D 46/446* (2013.01); *B60H 1/00378* (2013.01); *B60H 3/0633* (2013.01); *B60H 3/0641* (2013.01); *B01D 2279/40* (2013.01); *B60H 2003/0683* (2013.01)

(58) Field of Classification Search
CPC .............. B60H 3/06; B60H 1/00; B60H 1/26
USPC ............ 55/385.1, 385.3; 454/137, 136, 158; 296/190.09
See application file for complete search history.

(56) References Cited

U.S. PATENT DOCUMENTS

| | | | | |
|---|---|---|---|---|
| 7,377,848 B2 * | 5/2008 | Voit, II | .............. | B60H 1/00378 296/190.09 |
| 2007/0205633 A1 * | 9/2007 | Waco | ................. | B60H 1/00378 296/190.09 |
| 2013/0059521 A1 | 3/2013 | Loup et al. | | |

FOREIGN PATENT DOCUMENTS

| | | |
|---|---|---|
| CA | 1179480 A1 | 12/1984 |
| DE | 19952772 C1 | 1/2001 |
| | (Continued) | |

OTHER PUBLICATIONS

European Patent Office, International Search Report for related European Patent Application No. EP16173402, dated Nov. 29, 2016.

(Continued)

*Primary Examiner* — Christopher P Jones
*Assistant Examiner* — Minh-Chau Pham

(57) ABSTRACT

There is described a HVAC pre-filter system for a vehicle. The pre-filter system acts to prevent relatively large or coarse debris from reaching a dedicated HVAC filter through the use of at least one pre-filter element, which is provided in at least one inlet/outlet connected to ambient air. The pre-filter system has an inlet to supply air to the HVAC system, and an outlet to allow for air to exit from a vehicle cab interior, and the inlet/outlet can be switched to be fluidly coupled with either the HVAC inlet or the cab outlet. Dependent on which inlet or outlet the inlet/outlet is coupled with, the flow direction in the inlet/outlet can be controlled. Accordingly, the pre-filter can be cleaned of accumulated dust and debris by reversing the direction of airflow through the inlet/outlet.

16 Claims, 5 Drawing Sheets

(56) References Cited

FOREIGN PATENT DOCUMENTS

| | | | |
|---|---|---|---|
| EP | 0736403 | A2 | 10/1996 |
| EP | 2451463 | A1 | 5/2012 |
| GB | 2521450 | A | 6/2015 |
| JP | H07 101236 | A | 4/1995 |
| JP | 2007 168706 | A | 7/2007 |
| WO | WO 2012/001095 | A1 * | 5/2012 ............... B60H 1/00 |

OTHER PUBLICATIONS

UK Intellectual Property Office, International Search Report for related UK Application No. GB1516262.1, dated Apr. 13, 2016.

* cited by examiner

VEHICLE FILTER SYSTEM

BACKGROUND OF THE INVENTION

Field of the Invention

The present invention relates to a filter system for a vehicle, in particular a pre-filter system for a vehicle HVAC system.

Description of Related Art

Vehicles are regularly provided with dedicated HVAC (heating, ventilation, and air conditioning) systems, to control environment conditions within a vehicle cab, for the purpose of operator comfort.

An example outline of a known HVAC system configuration is provided in FIG. 2. A vehicle cab 100 is provided with a connected HVAC unit 102 which may comprise suitable blowers, condensers, evaporators, etc., necessary for regulation of the temperature in the interior 104 of the vehicle cab 100. The HVAC unit 102 is operable to draw in ambient air 106 from the exterior of the vehicle through inlet 108, for appropriate heating or cooling as required. An HVAC filter 110 is provided between the HVAC unit 102 and the ambient air 106, to prevent external debris from entering the HVAC unit 102. The exhaust air from the cab interior 104 is returned to the external environment via outlet 112.

A problem with the use of such a HVAC system, and in particular for agricultural use for example in tractors and harvesters, is that the external environment may contain high levels or dust or other debris, such as chaff. In such situations, the HVAC filter 110 is prone to frequent obstruction and possible blockage due to accumulated debris on the externally-facing side of the filter. In such situations, the performance of the HVAC system is negatively impacted until the filter can be cleaned of accumulated debris.

A known solution to this issue is to stop the vehicle, and to perform a manual cleaning of the HVAC filter 110, e.g. by an operator leaving the cab and directly accessing the filter surface. However, such an approach results in interruption to vehicle operating time, and a disruption of operator comfort.

An alternative solution is to reverse the direction of flow of the HVAC unit 102 such that the air flow direction in the system is reversed, to blow away any accumulated debris from the filter 110 surface. However, such action can require a relatively large air pressure to effectively clean the HVAC filer 110, which can result in increased energy consumption of the system. Furthermore, the HVAC operation is interrupted, which may result in disruption to operator comfort.

It is an object of the invention to provide a filter system for a vehicle HVAC system which addresses the above problems.

OVERVIEW OF THE INVENTION

Accordingly, there is provided a HVAC pre-filter system for a vehicle, the system comprising:

a HVAC inlet arranged to provide airflow to a vehicle HVAC system;

a cab outlet arranged to provide airflow exiting from a vehicle cab;

at least a first inlet/outlet arranged to be connected to ambient air, a pre-filter provided in said first inlet/outlet; and a flow direction system arranged to switch between:
  (i) a first state, where said at least a first inlet/outlet is connected to said HVAC inlet to provide ambient air to a vehicle HVAC system, and
  (ii) a second state, where said at least a first inlet/outlet is connected to said cab outlet such that airflow exiting from a vehicle cab to the ambient air acts to clean the pre-filter of said at least a first inlet/outlet.

The use of a pre-filter upstream of the vehicle HVAC system prevents a portion of debris from reaching the HVAC system itself, reducing the frequency of cleaning operations that need to be performed for the HVAC system filter. In addition, by re-routing air from a vehicle cab to exit via the at least a first inlet/outlet, the pre-filter provided in the inlet/outlet can be easily cleaned of any accumulated dust and other debris by the exiting airflow from the cab, without adjusting the flow direction of the HVAC system itself.

Preferably, the HVAC pre-filter system comprises at least a second inlet/outlet arranged to be connected to ambient air, a pre-filter provided in said second inlet/outlet, wherein said flow direction system is arranged such that:
  (i) in said first state, said second inlet/outlet is connected to said cab outlet such that airflow exiting from a vehicle cab to the ambient air acts to clean the pre-filter of said second inlet/outlet, and
  (ii) in said second state, said second inlet/outlet is connected to said HVAC inlet to provide ambient air to a vehicle HVAC system.

The flow direction system is arranged to selectively connect the cab outlet to one of said first and second inlet/outlets, and to connect the HVAC inlet to the other of said first and second inlet/outlets. By re-routing air from a vehicle cab to selectively exit via either of the first and second inlet/outlets, the pre-filters provided in the first and second inlet/outlets may be cleaned of accumulated dust and other debris by the exiting airflow from the cab. In addition, the use of two switchable inlet/outlets provides for uninterrupted flow of air into the HVAC system and out of the cab.

Preferably, the flow direction system comprises a switching valve, preferably a four-way valve, e.g. a four-way double L port valve, or a four-way butterfly valve.

Preferably, the flow switching is controlled by a controller, wherein the valve switching is controlled based at least in part on at least one of the following: a time duration, airflow pressure, airflow velocity, a user input.

Preferably, the HVAC pre-filter system is provided with at least one pressure sensor, wherein the switching valve is controlled to switch based on a measured airflow pressure detected by the pressure sensor.

In one aspect, the flow switching may switch when a measured pressure drops below a predefined low pressure level. In an additional or alternative aspect, the flow switching may switch when a measured pressure exceeds a predefined high pressure level.

The pressure sensor is preferably provided in the HVAC inlet, to measure the pressure of airflow routed to the HVAC system.

If the measured pressure in the HVAC inlet drops, this may be an indication that the pre-filter in the inlet/outlet currently connected to the HVAC inlet is obscured by debris. Accordingly, switching the flow direction system such that the other of the inlet/outlets is connected to the HVAC inlet allows for an unobscured flow of ambient air to the HVAC system. In addition, the obscured pre-filter can be cleaned by the action of the exit air from the vehicle cab through the cab outlet to the obscured inlet/outlet.

Additionally or alternatively, a pressure sensor may be provided in the first and/or second inlet/outlets, to measure the pressure of airflow flowing in the said first and/or second inlet/outlets.

The pressure level in the inlet/outlets may also be monitored, to provide a more accurate indication of the flow conditions in each of the inlet/outlets.

It will be understood that pressure sensors provided in the first and/or second inlet/outlets are preferably located at the cab-facing side of the pre-filters provided in the said first and/or second inlet/outlets.

As dust and debris is most likely to accumulate on the externally-facing sides of the pre-filters, arranging pressure sensors on the internally-facing sides of the filters provides an indication if the pre-filters are obscured, due to a drop in airflow pressure for ambient air flowing through the pre-filter from the exterior of the cab to the HVAC and cab interior.

It will be understood that the system may comprise a plurality of pressure sensors. In one aspect, the flow switching is based on a pressure differential between the measured pressure in different areas of the HVAC pre-filter system, e.g. a pressure differential between the measured airflow pressure in the first and second inlet/outlets.

Additionally or alternatively, the HVAC pre-filter system is provided with a timer, wherein the flow switching is controlled to switch after a pre-determined time has elapsed.

In one aspect, the HVAC pre-filter system is provided with a controller arranged to control the operation of the flow direction system. Additionally or alternatively, the HVAC pre-filter system is arranged to receive an input from a vehicle electronic control unit (ECU) to control the operation of the flow direction system.

There is also provided a vehicle, preferably an agricultural tractor or harvester, the vehicle comprising a vehicle cab, a vehicle HVAC system coupled with said cab, and a HVAC pre-filter system as described above coupled with said cab and said HVAC system.

It will be understood that the HVAC system comprises at least one blower arranged to draw air, preferably ambient air, in through the HVAC inlet.

Preferably, said HVAC pre-filter system is provided in a roof of the vehicle cab.

Preferably, the HVAC pre-filter system comprises at least one pre-filter arranged at an external surface of the vehicle.

BRIEF DESCRIPTION OF THE DRAWINGS

Embodiments of the invention will now be described, by way of example only, with reference to the accompanying drawings, in which.

It will be understood that the accompanying drawings are provided as representative diagrammatic figures, and are not to scale.

DETAILED DESCRIPTION OF EXEMPLARY EMBODIMENTS

Figure 1:
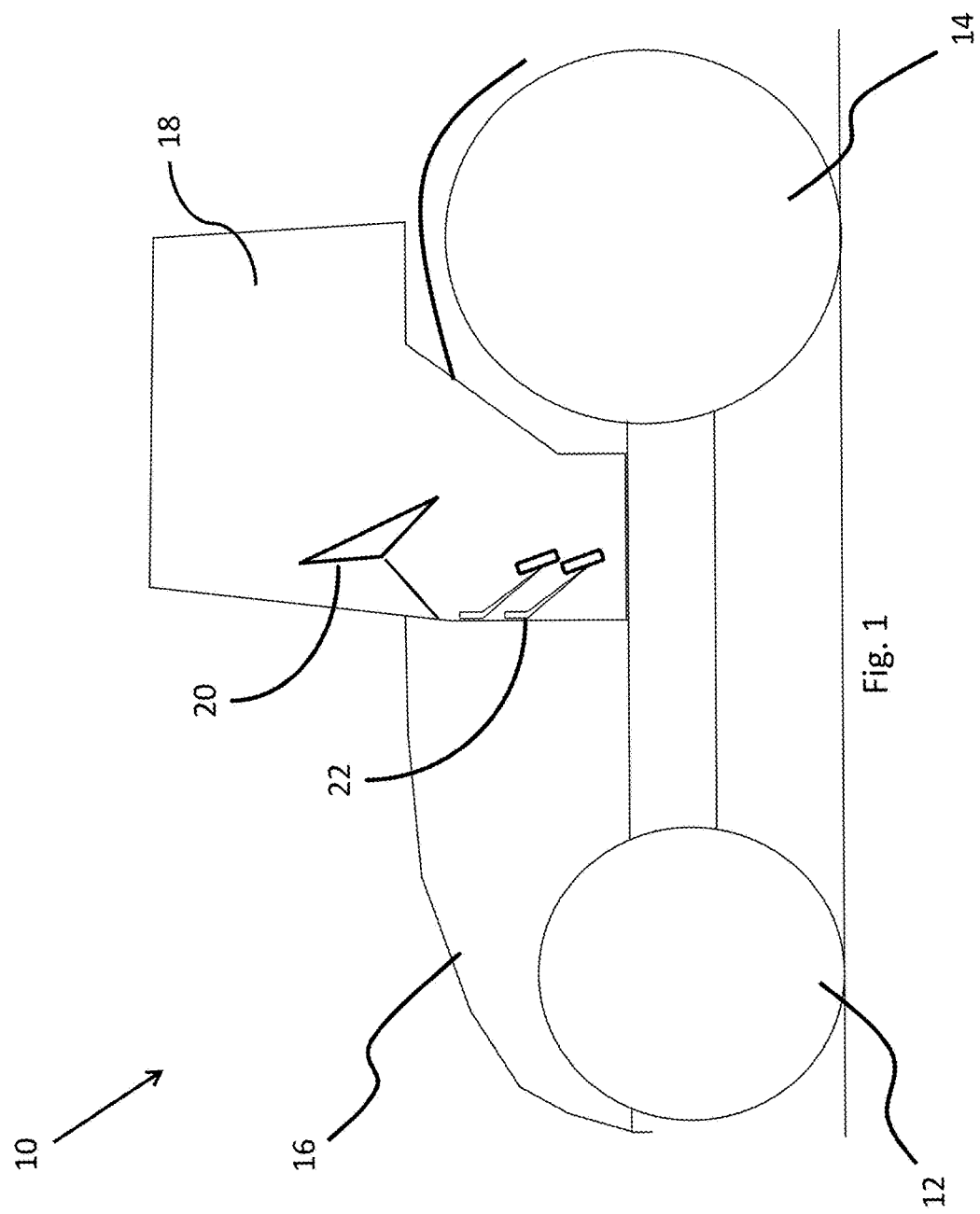
FIG. 1 is an illustration of an agricultural tractor according to the invention.
Figure 2:
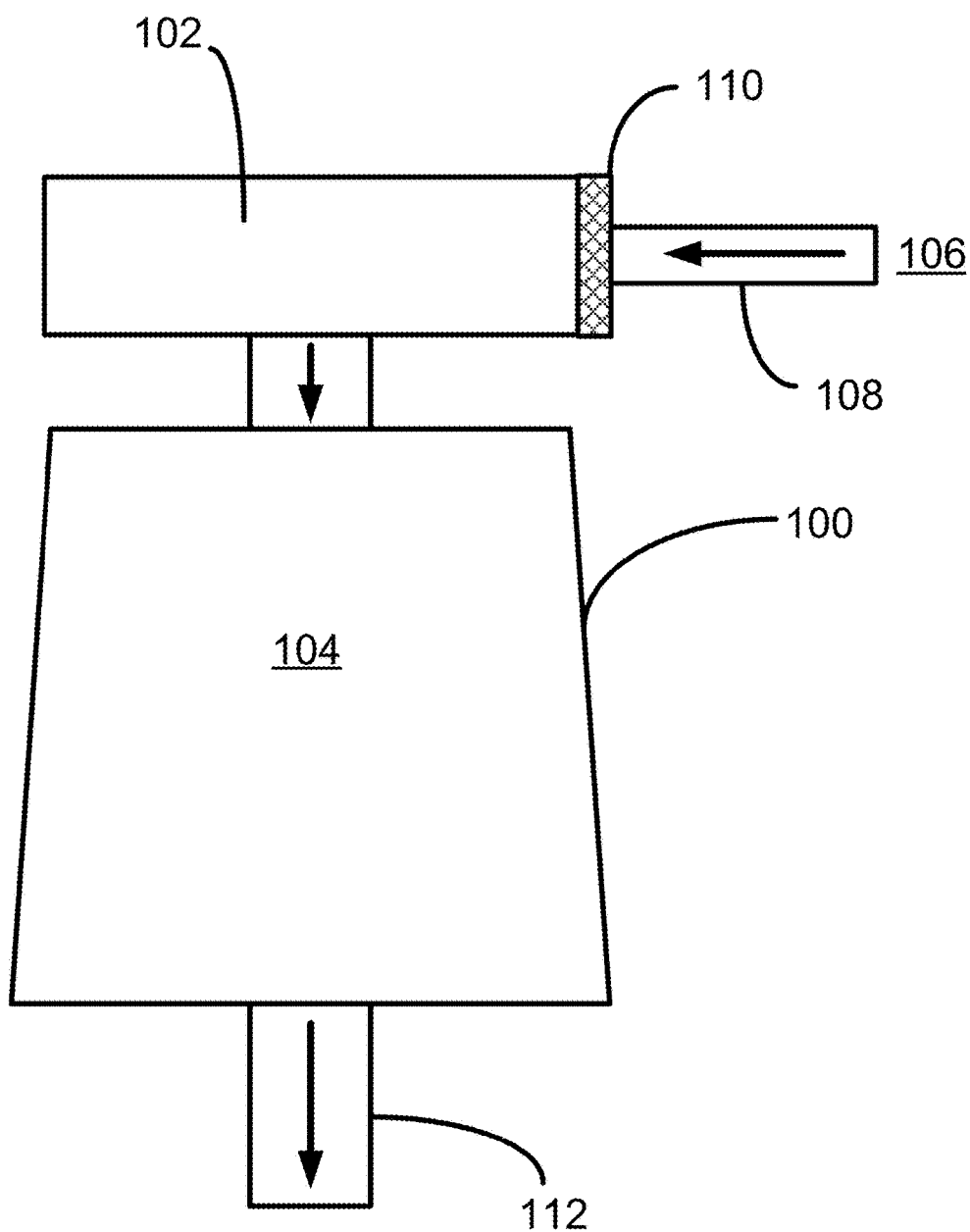
FIG. 2 is an outline of a prior art HVAC system configuration.

With reference to FIG. 1, a vehicle according to the invention in the form of an agricultural tractor is indicated at 10. The tractor 10 comprises front wheels 12 and rear wheels 14, a forward engine section 16 and a cab section 18. The cab section 18 defines an internal space 20 in which a tractor operator is seated during vehicle operation. The internal space 20 is substantially sealed from the ambient environmental conditions 22 exterior to the cab section 18. The cab section 18 is provided with a cab roof unit 24. A vehicle HVAC system (26, FIG. 3) is preferably provided in the roof unit 20, but it will be understood that the HVAC system may be provided in any other suitable location on the tractor 10, e.g. beneath the cab section 18.

Figure 3:
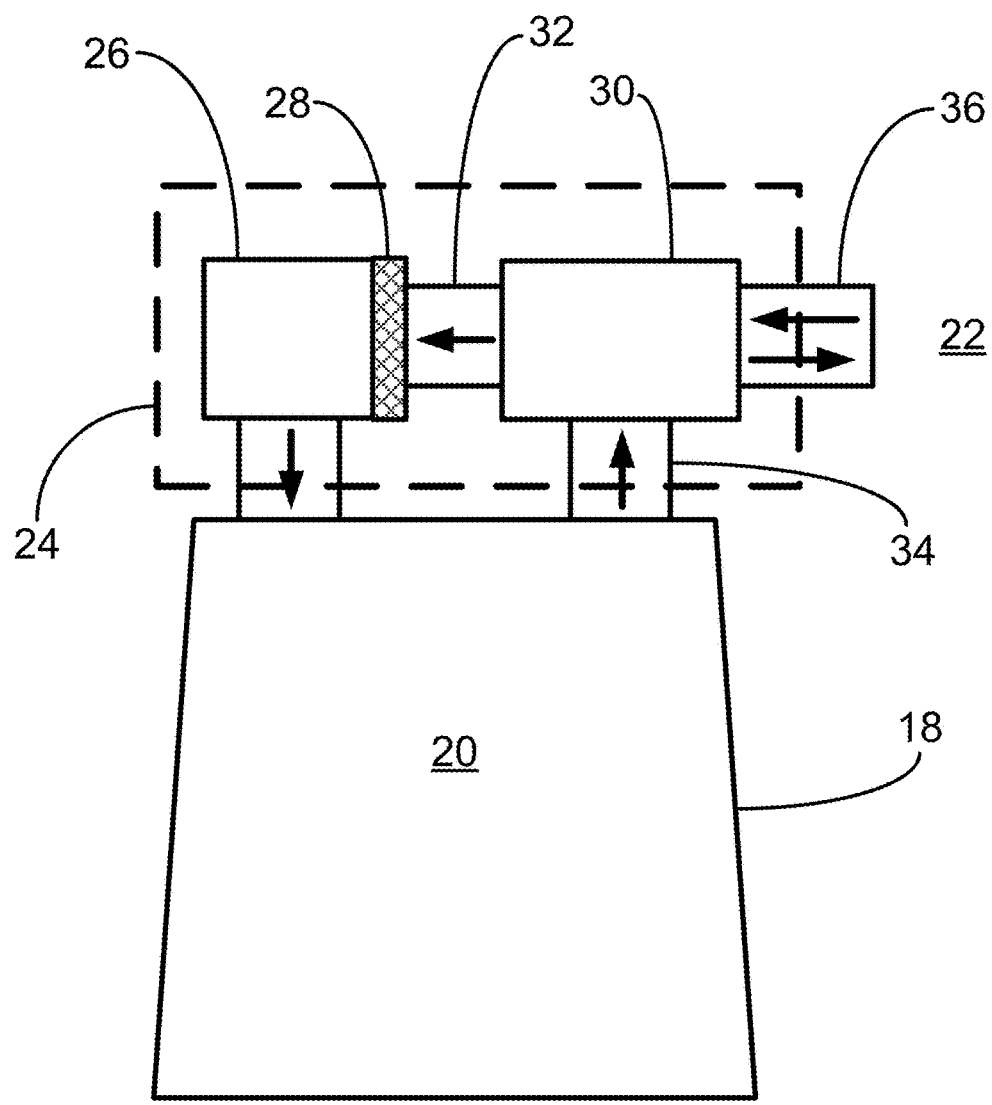
FIG. 3 is an outline of a HVAC system configuration according to the invention.

An embodiment of a vehicle HVAC system having a HVAC pre-filter system for a vehicle according to the invention is shown in FIG. 3. The roof unit 24 is shown in broken-line outline, wherein the vehicle HVAC system 26 is housed as part of the roof unit 24. The HVAC system 26 is provided with a HVAC filter 28 which is used to filter airflow before entering the HVAC system 26, prior to supply to the interior 20 of the cab 18.

The vehicle further comprises a HVAC pre-filter system 30. In the embodiment shown, the HVAC pre-filter system 30 is located in the roof unit 24 adjacent the HVAC system 26, but it will be understood that the HVAC pre-filter system 30 may alternatively be located in any other suitable location on a vehicle 10.

The HVAC pre-filter system 30 comprises a HVAC inlet 32 which connects the HVAC pre-filter system 30 to the filter 28 of the HVAC system 26. The HVAC pre-filter system 30 further comprises a cab outlet 34, which connects the interior 20 of the cab 18 to the HVAC pre-filter system 30, to allow for air to exit from the cab interior 20. The HVAC pre-filter system 30 further comprises an inlet/outlet arrangement 36, which connects the HVAC pre-filter system 30 with the exterior ambient air 22, and allows for ambient air to enter the assembly provided in the roof unit 36, and for exhaust air to exit from the vehicle to the ambient air 22.

Figure 5:
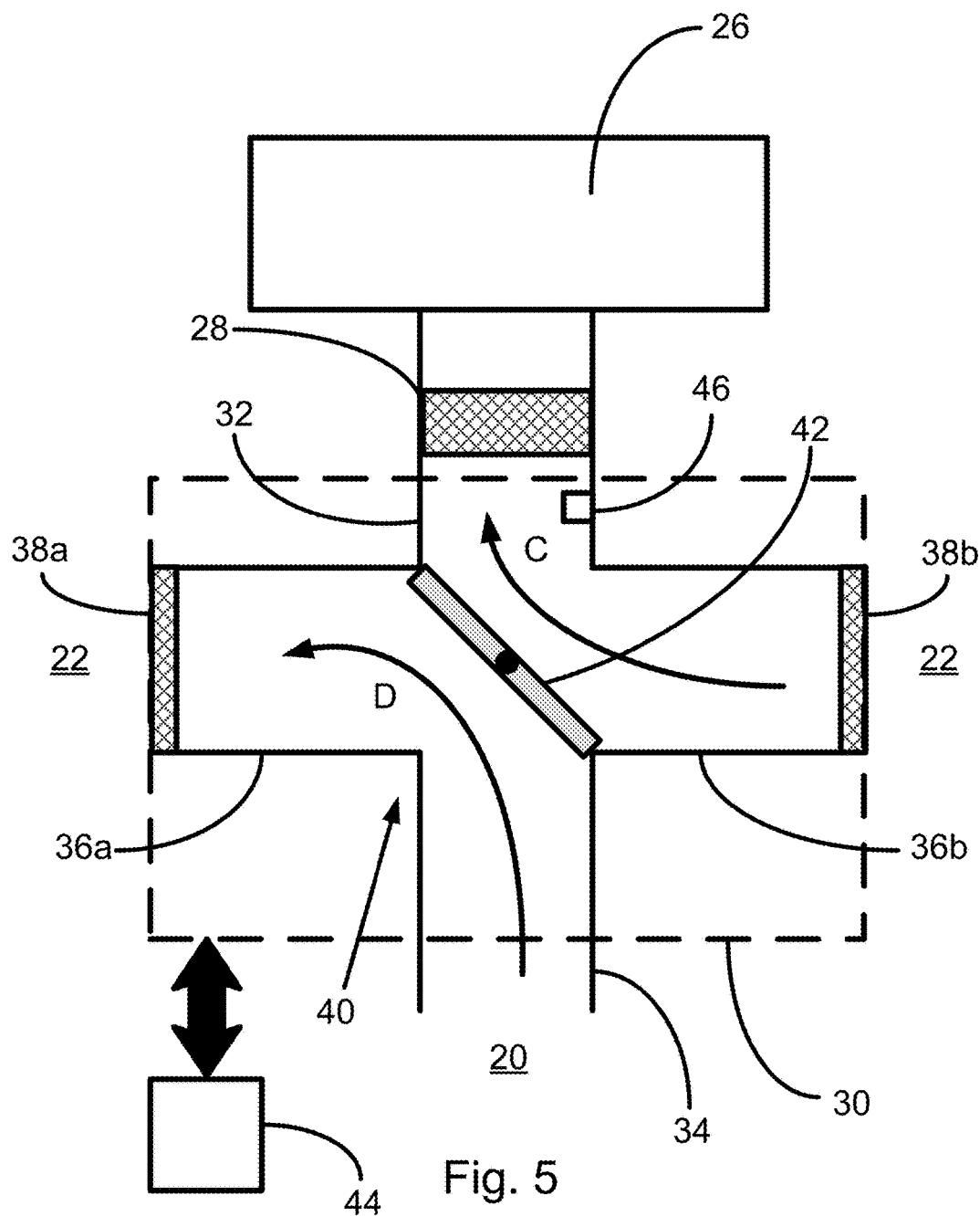
FIG. 5 is a diagram of the system of FIG. 4 when in a second state.

The assembly of the HVAC system 26 and the HVAC pre-filter system 30 is shown in more detail in FIGS. 5 & 6.

Figure 4:
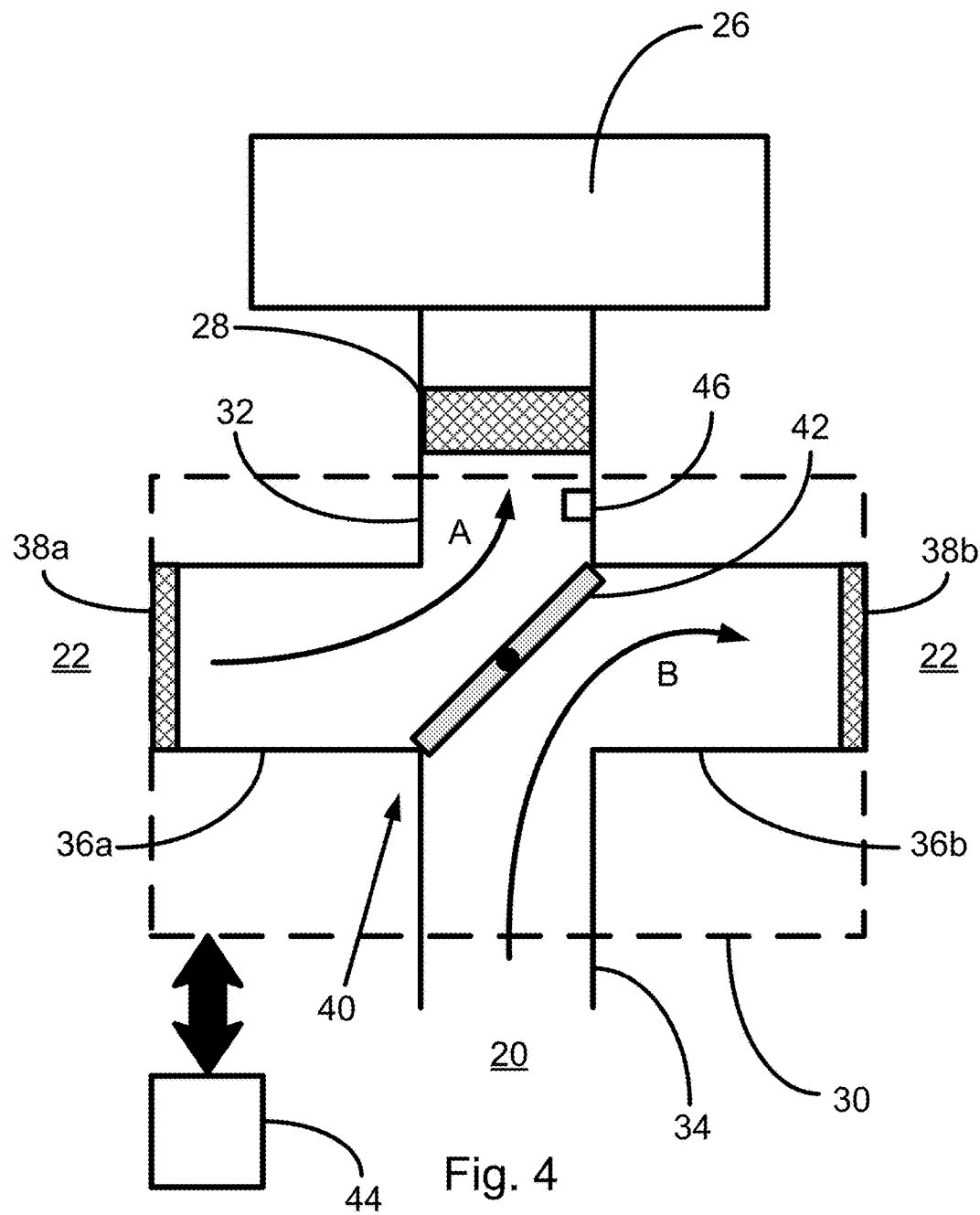
FIG. 4 is a diagram of a portion of the HVAC system configuration of FIG. 3 when in a first state.

In FIGS. 4 & 5, the HVAC pre-filter system 30 is indicated in dashed-line outline, in combination with the HVAC system 26 and HVAC filter 28. The inlet/outlet arrangement 36 of the pre-filter system 30 includes a first inlet/outlet 36a and a second inlet/outlet 36b. A first pre-filter 38a is located in the first inlet/outlet 36a, and a second pre-filter 38b is located in the second inlet/outlet 36b. The pre-filters 38a,38b may be provided as any grate- or grille-like structure suitable to prevent the passage of relatively large or coarse dust or debris. The use of pre-filters 38a,38b in addition to the dedicated HVAC filter 28 reduces the amount of such debris from reaching the HVAC filter 28, and accordingly reduces the cleaning frequency for the HVAC filter itself.

In the embodiment shown, the HVAC inlet 32, the cab outlet 34, and the first and second inlet/outlets 36a,36b are arranged in a cruciform configuration, the first and second inlet/outlets 36a,36b positioned at opposite sides of the pre-filter system 30. In a preferred aspect, the first and second inlet/outlets 36a,36b are arranged such that the first and second pre-filters 38a,38b are located at opposite lateral sides of the roof unit 24, but it will be understood that other arrangements of the pre-filter system 30 may be provided.

The HVAC inlet 32, the cab outlet 34, and the first and second inlet/outlets 36a,36b are fluidly coupled with each other at a central cross junction 40. A flow direction switching device 42 is provided in the central cross junction 40. The flow switching device 42 in the embodiment shown is provided as a simple four-way butterfly valve, but it will be understood that other configurations of flow switching device may be used, e.g. a four-way double L port valve. The flow switching device 42 is arranged to pivot within the central cross junction 40, to selectively connect the respective first and second inlet/outlets 36a,36b with either the HVAC inlet 32 or the cab outlet 34. The flow switching device 42 may be provided with a sealing element about the edges of the flow switching device 42, to prevent leakages about the edges of the flow switching device 42.

In FIG. 4, the flow switching device 42 is positioned such that the first inlet/outlet 36a is fluidly connected with the HVAC inlet 32, and the second inlet/outlet 36b is fluidly connected with the cab outlet 34. Accordingly, as indicated by the arrow A, the HVAC system 26 is operable to draw in ambient air 22 through the first pre-filter 38a, in through the first inlet/outlet 36a to the HVAC inlet 32, and through the HVAC filter 28 to the HVAC system 26 for processing before communication to the cab 18. Similarly, as the cab interior 20 is of a higher air pressure than the ambient air 22 due to the pressuring effect of the HVAC system 26, as indicated by arrow B, exhaust air will flow out of the cab interior 20 through the cab outlet 34, and will flow to the exterior of the cab through the second inlet/outlet 36b and through the second pre-filter 38b. The external flow of air through the second pre-filter 38b acts to clean the second pre-filter 38b of any dust or debris from the outside of the vehicle.

During operation, if the first pre-filter 38a becomes obstructed or blocked due to an accumulation of external dust or debris, the pre-filter system 30 is operable to switch the flow switching device 42 to alternate the connection of the first and second inlet/outlets 36a,36b and the respective HVAC inlet 32 and cab outlet 34. In FIG. 5, the position of the flow switching device 42 has been adjusted, such that the first inlet/outlet 36a is fluidly connected with the cab outlet 34, and the second inlet/outlet 36b is fluidly connected with the HVAC inlet 32. In this case, as indicated by the arrow C, the HVAC system 26 is operable to draw in ambient air 22 through the second pre-filter 38b, in through the second inlet/outlet 36b to the HVAC inlet 32, and through the HVAC filter 28 to the HVAC system 26 for processing before communication to the cab 18. Similarly, as indicated by arrow D, exhaust air will flow out of the cab interior 20 through the cab outlet 34, and will flow to the exterior of the cab through the first inlet/outlet 36a and through the first pre-filter 38a. The external flow of air through the first pre-filter 38a acts to clean the first pre-filter 38a of any accumulated dust or debris, to clear away any obstruction or blockage of the pre-filter.

The pre-filter system 30 is provided with a controller 44, which is operable to control the switching of the flow switching device 42. The controller 44 may be provided as a dedicated controller within the pre-filter system 30, or may be an external controller, for example a controller provided in the vehicle HVAC system 26 or as part of a vehicle electronic control unit (ECU). The controller 44 is preferably in communication with at least one sensor 46 which is used to monitor the operation of the vehicle 10 or the pre-filter system 30. The controller 44 is operable to control the switching of the flow switching device 42 based at least in part on at least one of the following: a time duration, a measured airflow pressure, a measured airflow velocity, a user input.

In one aspect, the pre-filter system 30 comprises a pressure sensor 44 provided in the HVAC inlet 32, to monitor the air pressure seen in the HVAC inlet 32. As a drop in air pressure in the HVAC inlet 32 can be indicative of an obstruction of air flow, the controller 44 is operable to switch the flow switching device 42 if the air pressure measured by the sensor 46 falls below a predefined pressure level. Switching the flow direction acts to reverse the flow through the pre-filters 38a,38b, to clean the pre-filters 38a,38b of any accumulated obstructing dust or debris.

If, after switching flow direction, the controller 44 determines that a blockage or obstruction of a pre-filter 38a,38b might still exist, the controller 44 can command that a user alert is displayed in the cab 18, to notify a vehicle operator that the HVAC system 26, HVAC filter 28, and/or the pre-filter unit 30 require inspection and/or service.

Additionally or alternatively, the pre-filter system 30 may comprise pressure sensors provided in one or both of the first and second inlet/outlets 36a,36b, to monitor the air pressure adjacent to the pre-filters 38a,38b. In such a system, the controller 44 is operable to switch the flow switching device 42 based on the air pressure measured in the inlet/outlets. Dependent on the flow direction within the first or second inlet/outlet 36a,36b, a blockage of the pre-filter 38a,38b may result in an increase or a decrease in the monitored air pressure within the first or second inlet/outlet 36a,36b, which the controller 44 can use to determine the need to switch the flow direction in the respective first or second inlet/outlets 36a,36b using the flow switching device 42.

Additionally or alternatively, the controller 44 may be operable to switch flow direction based on a relative change in monitored air pressure, and/or on a change in the differential pressure measured across the first and second inlet/outlets 36a,36b. In a further aspect, or in combination with the above embodiments, the controller 44 may be provided with a timer, wherein the controller is arranged to switch the direction of flow using the flow switching device 42 after a pre-defined time period.

In a further aspect, the controller 44 may be operable to control the switching based on an airflow velocity measurement, wherein the system comprises a flow velocity sensor located within one of the inlets, outlets or inlet/outlets of the pre-filter system. In this case, a variation of measured flow velocity may be indicative of an obstruction or blockage of a pre-filter element requiring a reversal of flow direction to provide a cleaning effect.

While the accompanying figures show a pre-filter system having two inlet/outlet connections with associated pre-filters, it will be understood that the pre-filter system may comprise any number of inlet/outlets to allow for the flow of air into the HVAC system and out of the cab, wherein the switching of flow direction within such inlet/outlets can be controlled using any number of flow switching devices.

Through controlled adjustment of the flow switching device 42, the direction of flow through the respective first and second pre-filters 38a,38b can be reversed, providing an effective method of cleaning the pre-filters 38a,38b which does not require interruption of vehicle operation or HVAC flow direction.

The invention is not limited to the embodiments described herein, and may be modified or adapted without departing from the scope of the present invention.

The invention claimed is:
1. An HVAC pre-filter system for a vehicle, the system comprising:
  an HVAC inlet arranged to provide airflow from the HVAC pre-filter system to a vehicle HVAC system, said vehicle HVAC system comprising a filter situated in the HVAC inlet;
  a cab outlet arranged to provide airflow exiting from a vehicle cab;

a first inlet/outlet arranged to be connected to ambient air, a pre-filter provided in said first inlet/outlet;

a second inlet/outlet arranged to be connected to ambient air, a pre-filter provided in said second inlet/outlet; and a flow direction system arranged to switch between:
- a first state, where said first inlet/outlet is connected to said HVAC inlet to provide ambient air to the vehicle HVAC system, and said second inlet/outlet is connected to the cab outlet such that airflow exiting from the vehicle cab to the ambient air acts to clean the pre-filter of the second inlet/outlet; and
- a second state, where said first inlet/outlet is connected to the cab outlet such that airflow exiting from the vehicle cab to the ambient air acts to clean the pre-filter of the first inlet/outlet and where the second inlet/outlet is connected to the HVAC inlet to provide ambient air to the vehicle HVAC system.

2. The HVAC pre-filter system of claim 1, wherein the flow direction system comprises a switching valve.

3. The HVAC pre-filter system of claim 2, wherein the switching valve comprises a four-way valve.

4. The HVAC pre-filter system of claim 1, wherein the switching of the flow direction system is controlled by a controller, wherein the switching is controlled based at least in part on at least one of the following: a time duration, airflow pressure, airflow velocity, a user input.

5. The HVAC pre-filter system of claim 4, wherein the HVAC pre-filter system is provided with at least one pressure sensor, wherein the flow direction system is controlled to switch based on a measured airflow pressure detected by the pressure sensor.

6. The HVAC pre-filter system of claim 5, wherein the flow direction system switches when a measured pressure drops below a predefined low pressure level.

7. The HVAC pre-filter system of claim 5, wherein the flow direction system switches when a measured pressure exceeds a predefined high pressure level.

8. The HVAC pre-filter system of claim 5, wherein the pressure sensor is provided in the HVAC inlet, to measure the pressure of airflow routed to the HVAC system.

9. The HVAC pre-filter system of claim 4, wherein at least one pressure sensor is provided in the first and/or second inlet/outlets, to measure the pressure of airflow flowing in the said first and/or second inlet/outlets.

10. The HVAC pre-filter system of claim 4, wherein the HVAC pre-filter system is provided with at least one airflow velocity sensor, wherein the flow direction system is controlled to switch based on a measured airflow velocity detected by the pressure sensor.

11. The HVAC pre-filter system of claim 4, wherein the HVAC pre-filter system is provided with a timer, wherein the flow direction system is controlled to switch after a predetermined time has elapsed.

12. A vehicle comprising a vehicle cab, a vehicle HVAC system coupled with said cab, and the HVAC pre-filter system as claimed in claim 1 coupled with said cab and said HVAC system.

13. The vehicle of claim 12, wherein the HVAC system comprises at least one blower arranged to draw air in through the HVAC inlet.

14. The vehicle of claim 13, wherein the HVAC system comprises at least one blower arranged to draw ambient air in through the HVAC inlet.

15. The vehicle of claim 12, wherein said HVAC pre-filter system is provided in a roof of the vehicle cab.

16. The vehicle of claim 12, wherein the HVAC pre-filter system comprises at least one pre-filter arranged at an external surface of the vehicle.

* * * * *